UNITED STATES PATENT OFFICE.

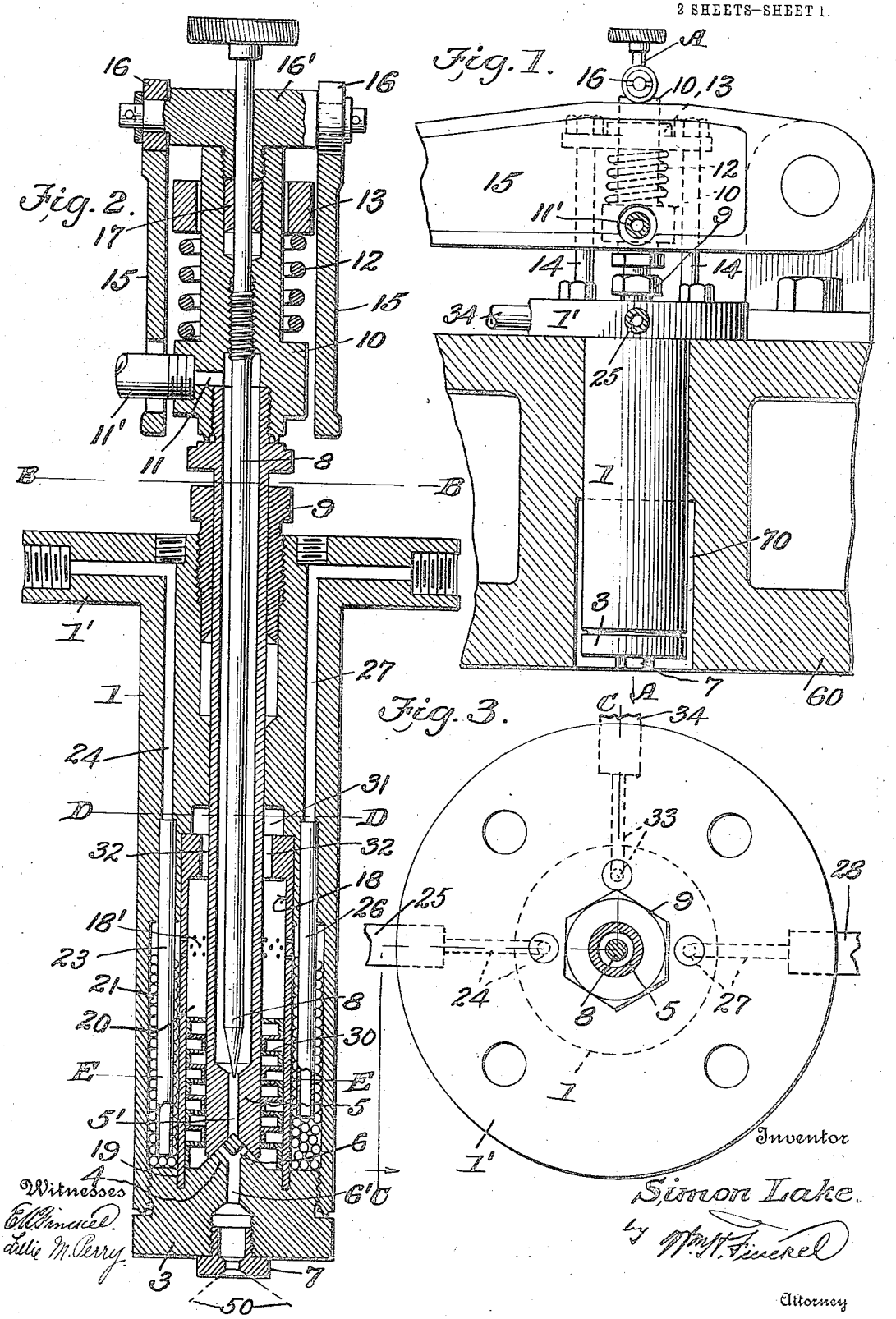

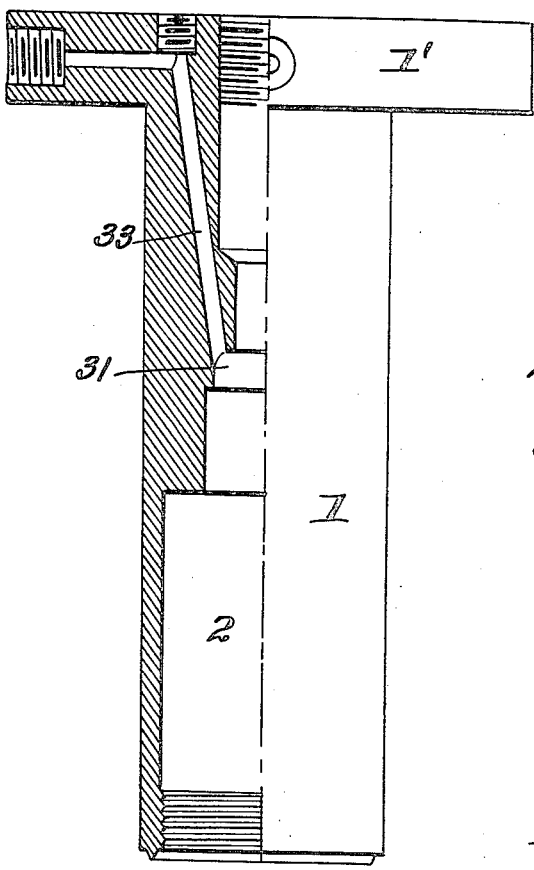
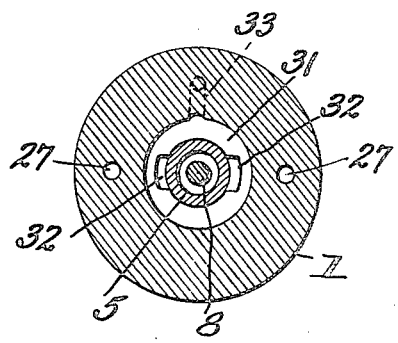
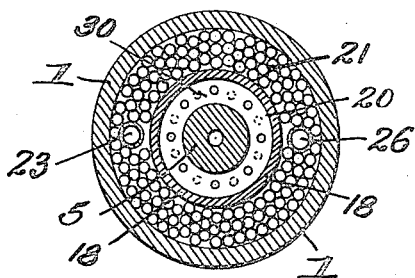
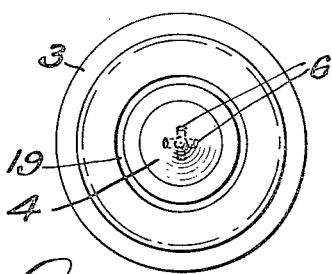
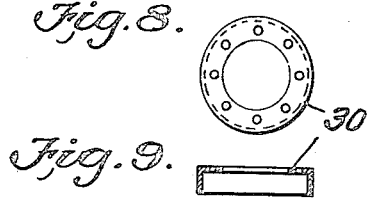

SIMON LAKE, OF MILFORD, CONNECTICUT.

FUEL-INJECTOR FOR INTERNAL-COMBUSTION ENGINES.

1,122,770.  Specification of Letters Patent.  Patented Dec. 29, 1914.

Application filed February 14, 1913. Serial No. 748,499.

*To all whom it may concern:*

Be it known that I, SIMON LAKE, a citizen of the United States, residing at Milford, in the county of New Haven and State of Connecticut, have invented certain new and useful Improvements in Fuel-Injectors for Internal-Combustion Engines, of which the following is a specification.

The object of the invention is to provide an efficient fuel injector for internal combustion engines, by which heavy oils may be more thoroughly mixed, atomized and vaporized, and by which the pressure for driving the fuel into the combustion chambers of high compression engines may be more economically produced and more economically used than is possible with other fuel injectors now in use.

It is well known that natural and refined oils contain substances that are not consumed except at exceedingly high temperatures, and that an internal combustion engine designed to run on gasolene or naphtha, for instance, will not burn kerosene or the heavier products of the refinery after the lighter oils have been distilled. In high compression engines wherein the air is first highly compressed and the fuel injected into the highly compressed and heated air, it is the practice to inject the fuel into the cylinder by means of highly compressed air. The injection of the highly compressed air along with the fuel tends to cool the air and fuel, since the air is allowed to expand and the compression consequently lowered upon entering the cylinder or combustion chamber. It also requires considerable power to furnish this highly compressed air which consumes part of the working power of the engine and thus reduces its efficiency.

With my improved injector I heat the fuel and air to nearly the temperature of the combustion chamber before admitting them into the said chamber, and I use only a small quantity of air in comparison to other devices now in use. I also secure a more thorough atomization of the fuel oil, and mix the same with superheated steam generated in the atomizer, and utilize the steam to drive the fuel into the combustion chamber wherein the steam is decomposed and burned with the mixture of air and fuel oil so that the hydrogen contained in the steam will, in itself, furnish a fuel. I also provide an injector by which I may introduce either a gas, a lighter and more easily ignitible oil along with the main supply of heavy oil, or by which I may admit a regulated quantity of air along with the combination of superheated steam and heavy oil so as to produce an easily ignitible mixture.

The invention consists in the peculiar and novel construction, combination and arrangement of parts as will be hereinafter fully described and then particularly pointed out in the claims.

In the drawings, illustrating the invention, in the several figures of which like parts are similarly designated Figure 1 is a side elevation of the injector attached to the head of a cylinder of an internal combustion engine, only a portion of the head being shown and that portion in section. Fig. 2 is a vertical longitudinal section drawn on a larger scale on the line A—A of Fig. 1. Fig. 3 is a horizontal section drawn on the line B—B of Fig. 2. Fig. 4 is a vertical sectional elevation of the casing of the injector drawn on the line C—C of Fig. 3. Fig. 5 is a plan view of the plug for closing the lower end of the casing and which provides a valve seat for the valve controlling the admission of the fuel into the combustion chamber. Fig. 6 is a horizontal section drawn on the line D—D of Fig. 2. Fig. 7 is a horizontal section drawn on the line E—E of Fig. 2. Fig. 8 is a plan view of one of the disks arranged in the mixing chamber of the injector, and Fig. 9 is a sectional view of said disk.

The body or casing 1 of the injector is preferably cylindrical in cross-section and is formed at its upper end with a flange head 1' by which the injector is secured to the cylinder head. The body of the casing is formed with a central bore of different diameters extending entirely through its length and largest at the lower end of the casing, thus providing a chamber 2, Fig. 4, which is closed at its lower end by a plug 3 screwed into the lower end of the casing. The plug 3 is formed with a central cone-shape extension 4 providing a valve-seat for a hollow valve 5 which controls outlet ports or passages 6 formed in and adjacent to the apex of the cone-shape valve seat 4, which ports open into a central outlet port or passage 6" extending through the plug and opening into the combustion chamber of the engine. The lower end of the passage 6' is enlarged and threaded to receive a plug 7 which has a contracted outlet above which is a small mixing chamber in the plug for the purpose hereinafter appearing.

The hollow valve 5 extends up through the bore of the casing 1 and has a contracted discharge opening 5' at is lower end into which fits the apex of the cone-shape valve seat 4. The discharge opening 5' is controlled by a needle-valve 8 extending down through the valve 5. The upper end of the valve 5 extends through a stuffing-box formed in the upper end of the casing 1, and through a gland 9 screwed into the stuffing-box and has its extreme upper end threaded to receive a head 10 through which the stem of the needle-valve 8 passes. The stem of the valve 8 is formed with a threaded section which works in a threaded section in the head 10, so that the point of the said valve may be adjusted toward or away from the outlet 5' to thereby regulate the flow through said outlet. The upper end of the stem of the valve 8 is provided with a milled head to facilitate the adjustment of the valve. The lower end of the head 10 is formed with an air inlet 11 which communicates with the bore of the valve 5, and is connected by a pipe 11' with a suitable source of compressed air supply (not shown), or with a gas tank (not shown), or with a source of easily inflammable material as desired.

The valve 5 is normally held to its seat by an expansion spring 12 interposed between an enlargement formed on the lower end of the head 10 and a collar 13 surrounding the head adjacent to its upper end, said collar being supported by studs 14 extending upwardly from the head 1' of the injector, and the said valve 5 is lifted from its seat by a lever 15 operated in any suitable manner by the crank-shaft of the engine, which engages anti-friction rollers 16 carried at the ends of a cross-head or arm 16' secured to the upper end of the head 10. As shown the cross-arm is formed with a centrally depending threaded nipple which screws into the upper end of the head 10 and serves also to hold a gland 17 in the stuffing box formed in the head through which the said stem of the needle-valve passes to thus prevent leakage of the compressed air or gas through the upper end of the head that is let into the bore of the valve 5. As is also shown the stem of the needle valve 8 passes through the cross-arm 16'. It is obvious by this construction that as the outer end of the lever 15 is raised the valve 5 will be lifted from its seat and that the needle-valve 8 will always be maintained in the position with respect to the outlet 5' to which it has been adjusted.

In the chamber 2 of the casing is a cylindrical sleeve 18 whose upper end is tightly held in a contracted extension of the chamber 2 and whose lower end is tightly held in an annular groove 19 formed in the upper face of the plug 3, the upper end of said sleeve being formed with an inwardly extending flange through which the stem of the valve 5 passes. This sleeve divides the chamber 2 into a fuel mixing chamber 20, surrounding the lower end of the valve 5 and an outer chamber 21 which I prefer to call a gas generating chamber, which is formed between the wall of the sleeve 18 and the comparatively thin wall of the lower end of the casing 1. The said chambers 20 and 21 are thrown into communication by means of a series of minute perforations 18' arranged in the sleeve 18 adjacent to its upper end entirely around its circumference. Extending down into the gas generating chamber 21 to a point adjacent to the bottom of said chamber, is a water tube 23 which communicates with a water passage 24 formed in the casing 1 and extended horizontally through the head 1' and connected by a supply pipe 25 with a suitable water pump (not shown). At the diametrically opposite side of the gas generating chamber from the tube 23 is an oil tube 26 that also extends down into the said chamber but terminating at a point higher up in the said chamber than the water tube 23. The upper end of the oil tube communicates with an oil passage 27 which extends upwardly through the casing 1 and through the head 1' and is connected by an oil supply pipe 28 with an oil pump (not shown). As shown the water tube 23 is extended down into the gas generating chamber below the lower end of the oil tube 26 so that the oil will enter the said chamber at a higher lever than the water and it will be obvious that as the oil and water are injected into the chamber the water will remain at the bottom owing to its greater specific gravity, and as water is much more expansible than oil when converted into steam even at moderate temperatures in comparison to the temperature required to volatilize the heavier oils, it will thus, when expanded, work its way up into the oil and become mixed therewith, thus producing a gas or vapor that will be easily ignitible when mixed with the required quantity of air.

In order to thoroughly agitate the oil and to cause it and the steam to take a devious course toward the outlets 18' leading into the mixing chamber 20, and also to more thoroughly heat the oil and water than would be possible through the heat of the wall of the casing, I nearly fill the gas generating chamber with small metal balls, or with wire around and between which the oil and steam pass on their way to the outlets 18', as will be more fully described in the general description of the operation of the device.

In the lower end of the mixing chamber 20 is arranged a series of spaced apart disks 30, having perforations arranged staggering so as to extend the path or course of the oil and steam during the passage to the combustion chamber, to thereby further disintegrate the oil so that it will enter the combustion chamber in an atomized condition.

Above the top of the sleeve 18 the casing 1 is formed with an air chamber 31 which communicates with the mixing chamber 20 through passages 32 formed in the flange at the top of the said sleeve, the said chamber being supplied with air under constant pressure through a passage 33, Fig. 4, extending upwardly through the casing 1 and horizontally through the head 1' and connected by an air pipe 34 with a suitable source of compressed air supply not shown.

The operation that takes place as the fuel is injected into the combustion chamber is as follows:—Fuel oil and water are injected into the gas generating chamber 21 in the proper quantities by pumps which are timed to inject the oil and water at the proper intervals during the operating cycle of the engine, the water at the bottom of the chamber and the oil on top of the water. On the compression stroke of the piston the temperature of the air in the combustion chamber is raised sufficiently to heat the water in the injector and cause it to be converted into steam which produces pressure in the said chamber and thus further heats and thins the oil and drives it into the mixing chamber where it is thoroughly mixed with the steam and the air contained in the latter chamber. As the oil and the steam rise in the gas generating chamber they will be forced to take a devious course around the metal balls thereby agitating the balls causing them to be kept constantly in motion and thereby preventing the adhesion of the oil to the balls and consequent clogging of the passages through them. By nearly filling the gas generating chamber with the balls the heat of the wall of the casing is transmitted throughout the entire chamber, thus thoroughly heating the entire charges of oil injected into the chamber. By the time the oil and steam have reached the top of the chamber the oil is so broken up that it readily escapes through the perforations 18' into the mixing chamber 20 along with the steam, and then as the valve 5 is lifted from its seat the finely divided particles of oil and the steam will rush down through the mixing chamber where they are further mixed with the air contained in said chamber. As the oil, air and steam are caused to take a zig-zag course through the perforations of the disks 30 they are more thoroughly mixed and the oil further divided or broken up. Now as the oil, air and steam strike the bottom of the chamber and rush up the sides of the cone valve seat to escape through the outlets 6 they will be met by a charge of downwardly rushing air coming through the valve 5 from the opposite direction to that of the mixture of oil, air and steam, so that the fresh air will commingle with the mixture thus tending to further break up the oil and to spray it into the combustion chamber in an atomized condition. As the mixture of oil, air and steam rushes through the chamber formed in the plug 4, an eddy will be set up in said chamber which tends to further mix the fuel before it finally escapes into the combustion chamber of the engine, and as it leaves the mouth of the outlet from said chamber, which as shown is flared outwardly, it will be sprayed outwardly in all directions as indicated by the dotted lines 50 in Fig. 2 to thus cause the charge to be easily ignited by the temperature of the highly heated compressed air in the combustion chamber.

In practice a constant and uniform desired pressure will be maintained in the hollow valve 5, so that if sufficient steam is not generated in the gas generating chamber to drive the fuel into the combustion chamber the fuel will be forced into said chamber by the air in the said hollow valve. As the engine continues to run, and the gas generating chamber of the injector is more thoroughly heated by the heat from the successive ignitions of the fuel in the combustion chamber, I then inject additional quantities of water with each charge of fuel oil to generate enough steam to drive the oil into the combustion chamber without the use of air, thus economizing in the use of the high compression air and consequently increasing the working power of the engine. I do not wish to be restricted to the use of steam alone for injecting the oil into the combustion chamber, as the steam may be used with air if desired. As shown in Fig. 1, the cylindrical casing of the injector is arranged in a bore formed in the head 60 of the cylinder, and in order that the heat of the combustion chamber may contact with the lower cylindrical section of the casing throughout the height of the gas generating chamber to thus thoroughly heat the said lower end and the balls therein, I purpose enlarging the lower end of the bore as at 70 so as to leave a space around the lower end of the casing.

In starting up or running the engine on heavy fuels, it may be necessary to supply a lighter grade of fuel oil or a gas to start combustion, and to this end I may inject through the hollow valve 5, a small quantity of naphtha, ether or an easily ignitible gas along with the heavier oils, the quantity being regulated by the needle valve, it being understood that the lighter fuel or gas rushing down through the valve 5 and mixing with the heavier fuel vapors on their way to the combustion chamber will produce a mixture more easily ignitible than the heavier fuel. After the engine has been running for a short time, however, and the combustion chamber and the inner end of the injector become hot, the lighter fuel may be cut off and a small quantity of compressed air admitted through the said valve 5 to mix with the fuel, as and for the purpose previously described. With certain grades of fuel oils the mixing of a small quantity of pure air with the fuel vapors is an advantage as it produces a mixture of gas and air that is easily ignitible when injected into the highly compressed and hot air in the combustion chamber. I may also, if desired, use an electric spark plug in starting the engine as used in all low compression engines now on the market.

From the foregoing it will be seen that I provide an exceedingly simple and highly efficient device that is particularly adapted for use in high compression heavy oil burning engines, the advantages of which will readily appear to those skilled in the art to which the invention relates.

What I claim is:—

1. A fuel injector for internal combustion engines, having a gas generating chamber and a mixing chamber inside of said gas generating chamber and communicating therewith, an outlet leading from said mixing chamber, a hollow valve for controlling said outlet, means to supply fuel oil and means to supply water to said gas generating chamber wherein the water is converted into steam, for the purpose specified, and means to supply air under pressure to said valve.

2. A fuel injector for internal combustion engines, having a gas generating chamber and a mixing chamber in open communication, means to supply fuel oil and means to supply water to said gas generating chamber wherein the water is converted into steam, as and for the purpose specified, an outlet leading from said mixing chamber, a hollow valve controlling said outlet, and means to supply air under pressure to said hollow valve.

3. A fuel injector for internal combustion engines, having an inner fuel mixing chamber provided with an outlet and a gas generating chamber surrounding said mixing chamber and in open communication therewith, means to supply fuel oil and means to supply water to said gas generating chamber, a hollow valve controlling the outlet from said mixing chamber, and means to supply air under pressure to said hollow valve.

4. In combination with an internal combustion engine, a fuel injector having its inner end exposed to the heat of the combustion chamber of the engine, and having a gas generating chamber provided with an outlet leading into the combustion chamber, a hollow valve controlling said outlet, means to supply fuel oil and means to supply water to said gas generating chamber wherein the water is converted into steam, as and for the purpose specified, and means to supply air under pressure to said hollow valve.

5. In combination with an internal combustion engine, a fuel injector having its inner end exposed to the heat of the combustion chamber of the engine, a gas generating chamber formed in the inner end of said injector, and a mixing chamber in communication with said gas generating chamber, a valve controlled opening leading from said mixing chamber to the combustion chamber of the engine, means to supply fuel oil and means to supply water to said gas generating chamber wherein the water is converted into steam by the heat of said combustion chamber to drive the oil into said combustion chamber.

6. A fuel injector for internal combustion engines, comprising a casing having a chamber in its lower end, a tubular sleeve arranged in said chamber dividing it into an outer gas generating chamber and an inner fuel mixing chamber communicating with the generating chamber, a valve controlled outlet leading from said mixing chamber, means to supply fuel oil and means to supply water to said gas generating chamber, for the purpose specified.

7. A fuel injector for internal combustion engines, comprising a casing having a chamber at one end, a cylindrical sleeve arranged in said chamber dividing it into an outer gas generating chamber and an inner mixing chamber communicating with the generating chamber, said casing having an outlet leading from said mixing chamber, a hollow valve controlling said outlet, means to supply fuel oil and means to supply water to said gas generating chamber, and means to supply air under pressure to said hollow valve.

8. A fuel injector for internal combustion engines, comprising a casing having a chamber at one end, a cylindrical sleeve arranged in said chamber dividing it into an outer gas generating chamber and an inner mixing chamber communicating with the generating chamber, a valve controlled outlet leading from said mixing chamber, metallic balls arranged in said gas generating chamber, means to supply fuel oil and means to supply water to said gas generating chamber.

9. A fuel injector for internal combustion engines, comprising a casing having a chamber at one end, a cylindrical sleeve arranged in said chamber dividing it into an outer gas generating chamber and an inner mixing chamber communicating with the generating chamber, an outlet formed in said casing leading from said mixing chamber, a hollow valve controlling said outlet having a contracted outlet in its lower end, a needle-valve controlling said contracted outlet, means to supply fuel oil and means to supply water to said gas generating chamber, and means to supply air under pressure to said hollow valve.

10. A fuel injector for internal combustion engines, comprising a casing having a chamber at one end, a cylindrical sleeve arranged in said chamber dividing it into an outer gas generating chamber and an inner mixing chamber, said chambers being in open communication, said casing having an outlet leading from said mixing chamber, a hollow valve controlling said outlet, a water supply tube and an oil supply tube extending into said gas generating chamber, said water tube having its discharge end arranged below the discharge end of said oil tube, for the purpose specified, independent means to supply water and oil to the respective tubes, and means to supply air under pressure to said hollow valve.

11. A fuel injector for internal combustion engines, having a gas generating chamber and a mixing chamber at one end in open commnication, a water supply tube and an oil supply tube extending into said gas generating chamber, said water tube having its discharge end located below the discharge end of said oil tube, a valve controlled outlet leading from said mixing chamber, balls arranged in said gas generating chamber, perforated plates arranged in said mixing chamber, and independent means to supply water and oil to the respective tubes.

12. A fuel injector for internal combustion engines, having a gas generating chamber and a mixing chamber at one end in communication, and an outlet leading from said mixing chamber, a water supply tube and an oil supply tube extending into said gas generating chamber, said water tube having its discharge end arranged below the discharge end of said oil tube, a valve having a hollow stem provided with a contracted discharge mouth controlling said outlet from said mixing chamber, a needle valve controlling said contracted discharge mouth, means to supply air under pressure to said valve stem, means to supply water and means to supply oil to the respective tubes, and means to supply air under pressure to said mixing chamber.

13. A fuel injector for internal combustion engines, having a gas generating chamber and a mixing chamber at one end in communication, and an outlet leading from said mixing chamber, a valve controlling said outlet, balls arranged in said gas generating chamber, perforated spaced apart disks arranged in said mixing chamber, and independent means to supply fuel oil and water to the said gas generating chamber.

14. A fuel injector for internal combustion engines, comprising a casing having a chamber at one end, a plug fitted into the end of said chamber having a conical valve seat provided with outlets, a valve fitting said conical valve seat controlling said outlets, a cylindrical sleeve arranged in said chamber dividing it into a gas generating chamber and a mixing chamber and having means establishing communication between the gas generating and mixing chambers, balls arranged in said gas generating chamber, perforated spaced apart disks arranged in said mixing chamber, an oil supply tube and a water supply tube extended into said gas generating chamber, said water tube having its discharge end arranged below the discharge end of said oil tube, and independent means to supply oil and water to the respective tubes.

15. A fuel injector for internal combustion engines, having a gas generating chamber and a mixing chamber at one end in communication, and an outlet leading from said mixing chamber, a valve controlling said outlet, a water supply tube and an oil supply tube extending into said gas generating chamber, said water tube having its discharge end arranged below the discharge end of said oil tube, for the purpose specified, and means to supply fuel ingredients to said generating chamber.

In testimony whereof I have hereunto set my hand this 11th day of February, A. D. 1913.

SIMON LAKE.

Witnesses:
C. E. ADAMS,
M. D. BLONDEL.